Feb. 3, 1953 H. A. BOYLES 2,627,093
ELASTIC BELT STRUCTURE
Filed Jan. 22, 1949
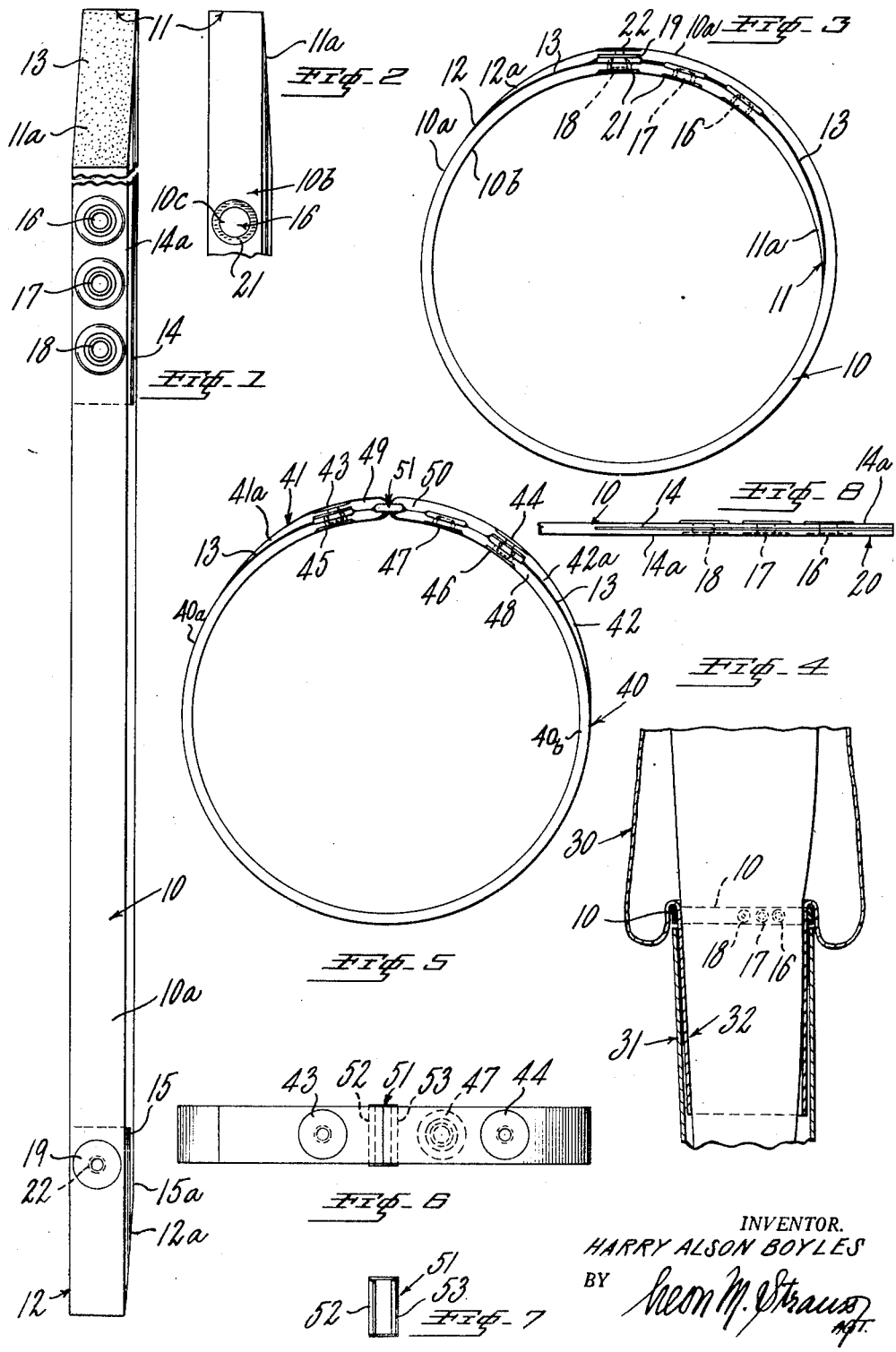
INVENTOR.
HARRY ALSON BOYLES
BY Leon M. Straus
AGT.

Patented Feb. 3, 1953

2,627,093

UNITED STATES PATENT OFFICE 2,627,093

ELASTIC BELT STRUCTURE

Harry Alson Boyles, Brooklyn, N. Y.

Application January 22, 1949, Serial No. 72,119

1 Claim. (Cl. 24—31)

The present invention relates generally to elastic belt or band structures, which may be used for pulley transmissions or for holding in place garment parts, such as leggings, scarves, etc.

It is an object of this invention to provide means affording different degrees of extensibility or elasticity of the elastic belt or band whereby zones or areas for anchoring belt connectors are obtained.

It is another object of the invention to provide means reinforcing the elastic band structure preferably at the extremities thereof in order to provide a substantially undisplaceable connection at the ends of the band.

It is another object of the present invention to provide means facilitating adjustability of the diameter of the belt when the belt ends are brought into engagement with each other.

A still further object of the invention is to provide means ensuring a substantially smooth and uninterrupted transition from one end to the other end of the elastic belt, whereby the inner diameter of the closed belt is substantially maintained and a continuous inner contact surface achieved.

It is a further object of the present invention to provide means for retaining the ends of the belt on the body thereof by application of pressure to said ends.

Still a further object of the invention is to provide means contributing to a substantially even inner running surface of the belt, when the same is transformed to closed position or endless form for use in transmission, etc.

Yet another object of the invention is to provide means rendering the possibility of changing certain characteristics, such as the stretchability of a strap or belt structure made of substantially elastic material at predetermined locations and over given length or lengths thereof without substantially or markedly altering the thickness or shape of the strap or belt structure, whereby the outer appearance remains generally the same throughout the extent of the belt structure.

With the above and other objects in view, the invention will be hereinafter more fully described and the combination and arrangement of parts will be shown in the accompanying drawing and pointed out in the claim which forms part of the specification.

In the drawing:

Fig. 1 is a somewhat perspective view of a strap or belt embodying the invention and as seen toward the outer surface of said belt.

Fig. 2 is a fragmentary view of one end of the belt similar to that of Fig. 1, but as seen toward the inner surface thereof.

Fig. 3 is a top plan view of the belt of Fig. 1 drawn to a reduced scale and in closed position.

Fig. 4 shows diagrammatically and in section the belt of Fig. 3 as applied to a legging.

Fig. 5 is a view similar to that of Fig. 3 with adjusting means of the belt in modified form.

Fig. 6 is a side elevation of the belt seen in Fig. 5.

Fig. 7 shows a top plan view of a loop element employed in the modified form seen in Figs. 5 and 6.

Fig. 8 is a fragmentary side elevation of one of the strap ends of Fig. 1.

Referring now more specifically to the drawing, there is shown in Fig. 1 a strap 10 made of rubber or other elastic, preferably plastic material of predetermined stretchability. Opposite ends 11, 12 of strap 10 are tapered, as shown, end 11 being provided with a sloping part 11a extending on the outer surface 10a, whereas end 12 is provided with a sloping part 12a extending on the inner surface 10b. Each end carries a layer 13 of pressure-sensitive adhesive for a purpose later described.

It is preferred to employ a strap 10 of rubber or rubber composition which is of substantially equal thickness throughout its length but for the tapered ends 11 and 12. These ends, in this instance, enclose each or have incorporated therein a piece of canvas, nylon or other substantially non-elastic fabric material 14, 15. Piece 14 is of greater length than that of piece 15, both pieces of material 14, 15 extending, if desired, throughout the width of strap 10 at locations 14a, 15a of said pieces, respectively, being exposed to view at the edges defining said ends, and markedly impairing the stretchability of the rubber strap thereat. These locations 14a, 15a thus facilitate the anchorage of fastening means, such as female snap buttons 16, 17, 18 and male snap button 19, respectively, of known construction.

In Fig. 2 the inner surface 10b of strap 10 is seen on which a ring-like member 21 of snap button 16 is positioned for securing the latter in position on outer surface 10a. In similar manner snap buttons 17 and 18 are anchored at reinforced location 14a on strap 10. Male snap button 19 has a stud 22 extending to said surface 10b, as may be visualized from Figs. 1 and 3.

As will be seen from Fig. 3, when strap 10 is assembled and adjusted by means of engagement of snap button 19 with any of the female snap buttons 16 or 17 or 18 and when exerting pressure upon the respective free ends 11 and 12, respectively, the pressure-sensitive layers 13 thereof will retain these tapered ends in position against surfaces 10b and 10a of the belt 10. Thus, a smooth and substantially even inner running surface 10b is achieved which encounters generally no obstacles or projections since ring members 21 of the female snap buttons 16, 17, 18 are exposed to face any engaging surface of a pulley of a transmission or the like (not shown). These ring members 21 of buttons 16, 17 and 18, however, are recessed with respect to outwardly bulging inner surface rubber portions 10c (Fig. 2), the latter only coming in direct contact with said pulley surface, as may be easily understood. Thus, any noisy transmission of pull or traction is effectively avoided.

Fig. 8 shows the straight end 20 of strap 10 to which fastener means 16, 17, 18 are applied at location 14a of the strap within which a non-stretchable insert 14 is integrally incorporated by vulcanization or the like.

Fig. 4 illustrates the application of strap 10 to a legging 30 above a shoe or boot 31 as used by soldiers, whereby the lower part 32 of legging 30 extends within said boot.

Fig. 5 shows a belt 40 in closed position and in a modified form. The reinforcing insert as hereinabove referred to is not shown in Figs. 3 and 5 for clarity's sake.

In this embodiment, both ends 41, 42 have male snap buttons 43, 44 which are adapted to engage respective female snap buttons 45, 46. A second female snap button 47 is arranged on belt end portion 48 for further adjusting purposes. Pressure sensitive adhesive layers 13 are provided at tapered ends 41a and 42a for the same purpose as hereinabove set forth with respect to strap ends 11a and 12a (Fig. 1).

The loops 49 and 50 which are formed in closed position of belt 40, and when ends 41, 42 are applied to the outer surface 40a of the belt 40 to overlie the same in superposed position, are interconnected by a closed loop link element 51 (Fig. 7). Element 51 has spaced, round pins 52, 53 which extend, respectively, through said loops 49, 50 and thus hold belt 40 in applied position on a pulley surface or the like (not shown), as may be easily understood. It is to be noted that female snap button parts 45, 46, 47 are anchored on running surface 40b of belt 40 in a manner as described with respect to snap button 16 (Fig. 2), so that always a smooth contact between the inner belt surface 40b and the surface of a pulley or the like is afforded.

It goes without saying that the inner belt surfaces 10b and 40b may be roughened, fluted or serrated in order to ensure at all times efficient grip with a surface for transmission of forces.

As seen in Fig. 8, it might not always be necessary to shape the ends of the strap or belt in a manner as seen in Figs. 1 to 3 and 5.

If a connection of the belt ends is chosen according to the embodiment of Fig. 5, it will be sufficient for many purposes not to use wedge-shaped strap ends with pressure-sensitive layers 13, but rather straight ends, as exemplified in Fig. 8.

It is to be noted that the reinforcement or non-stretchable insert of any suitable material (metal foil, fabric, etc.) may be disposed at other desirable locations of the lengthy strap for any contemplated purpose (anchorage, fixation, etc.).

It can thus be seen that there has been provided in accordance with the present invention a belt or like band structure comprising an elongated, elastic body terminating in opposite ends, adjusting means positioned adjacent said ends, respectively, and flexible, non-stretchable means, respectively, incorporated in predetermined locations of said ends of said body for facilitating anchorage of said adjusting means thereat, whereby the stretchability of said body is substantially maintained in lengthwise direction thereof but at said locations.

While there have been shown and described several embodiments of the invention, it is obvious that further changes may be made in the same without departing from the spirit of the invention.

Having thus described the invention, what is claimed as new and desired to be secured by Letters Patent, is:

A belt and like band structure comprising an elongated rubber body terminating in opposite substantially wedge-shaped ends, complementary snap button means for said body, means adapted to connect in superposed relation said ends and said rubber body, and flexible fabric strip means inserted in said wedge-shaped ends and extending into portions of said body adjacent said ends and without substantially altering the thickness and shape thereof, said complementary snap button means passing through said strip means and being anchored adjacent said ends, said fabric strip means being less stretchable than that part of said rubber body which extends between said ends, the flexibility of said elongated body in crosswise direction thereof remaining substantially unimpaired, the stretchability of said body between said ends differing from that at said ends in lengthwise direction thereof, said wedge-shaped ends forming surface transitions with said rubber body upon engagement of said snap button means with each other.

HARRY ALSON BOYLES.

REFERENCES CITED

The following references are of record in the file of this patent:

UNITED STATES PATENTS

| Number | Name | Date |
| --- | --- | --- |
| Re. 3,260 | Carrington | Jan. 12, 1869 |
| 67,197 | Jordan | July 30, 1867 |
| 200,517 | Curtiss | Feb. 19, 1878 |
| 441,693 | McElroy | Dec. 2, 1890 |
| 901,132 | Waltz | Oct. 13, 1908 |
| 941,659 | Shea | Nov. 30, 1909 |
| 1,756,038 | Shwayder | Apr. 29, 1930 |
| 2,373,328 | Morehouse | Apr. 10, 1945 |

FOREIGN PATENTS

| Number | Country | Date |
| --- | --- | --- |
| 16,080 | Great Britain | of 1908 |
| 545,897 | France | Aug. 3, 1922 |
| 47,745 | Denmark | Sept. 11, 1933 |